United States Patent [19]

Farb

[11] Patent Number: 4,885,607
[45] Date of Patent: Dec. 5, 1989

[54] METHOD AND DEVICE FOR SELECTING THE APPROPRIATE CONTRAST GRADE PHOTOGRAPHIC FOR PRINTING A BLACK AND WHITE TRANSPARENCY

[76] Inventor: Thomas F. Farb, Horizon Hill, P.O. Box 65, Lincoln Center, Mass. 01733

[21] Appl. No.: 245,993

[22] Filed: Sep. 14, 1988

Related U.S. Application Data

[63] Continuation of Ser. No. 85,584, Aug. 14, 1987, abandoned.

[51] Int. Cl.⁴ ............................................. G03B 27/72
[52] U.S. Cl. ........................................ 355/71; 355/77
[58] Field of Search .................................. 355/71, 77

[56] References Cited

U.S. PATENT DOCUMENTS 2,226,167  12/1940  Gillon .................................... 355/71
4,351,608   9/1982  Coote et al. ........................... 355/71

Primary Examiner—Monroe H. Hayes
Attorney, Agent, or Firm—Sprung, Horn, Kramer & Woods

[57] ABSTRACT

A device and method for selecting a contrast grade of paper or variable-contrast filter for printing a black and white negative utilizing a clear substrate having a plurality of sections, each section having a different color equivalent to a different variable contrast filter and each section having approximately the same density.

5 Claims, 1 Drawing Sheet

METHOD AND DEVICE FOR SELECTING THE APPROPRIATE CONTRAST GRADE PHOTOGRAPHIC FOR PRINTING A BLACK AND WHITE TRANSPARENCY

Tis application is a continuation of application Ser. No. 085,584, filed 8/14/87, now abandoned.

BACKGROUND OF THE INVENTION

The present invention relates to a method and a device for selecting the appropriate contrast grade photographic paper for printing a back and white transparency.

The contrast of the printed image from a negative can be controlled by the selection of photographic paper used in printing a negative or transparency. Black and white printing paper comes in a range of contrast grades. The normal contrast grade for paper generally is number two. Manufacturers generally produce contrast grades numbering from zero (very low contrast) to number five or six (very high contrast) in half steps.

An alternative to using graded-contrast paper is to print negatives with variable-contrast (also known as selective-contrast) paper. Only one kind of paper is provided and the photographer controls the contrast of the printed image by inserting variable-contrast filters between the light source of the enlarger and the variable-contrast paper. These filters are different colors and change the contrast of the printed image. These filters are generally available in the same contrast grades as for graded photographic paper.

When a negative is low in contrast the photographer selects a higher contrast grade of paper or, if using variable-contrast paper, a higher contrast grade filter. When a negative is high in contrast, the photographer selects a lower number contrast grade paper or variable-contrast filter. If a negative has a section that requires a different contrast grade than another, a photographer can expose the variable-contrast photographic paper with the negative but use different variable-contrast filters for different parts of the negative. This gives the photographer control of local contrast as well as contrast of the whole negative.

Contrast is defined as the density variation between light and dark objects in a negative or print. For example, if the same scene is photographed with two different films or printed with two different contrast grades of paper, one image may show a greater difference in density between light and dark objects in the scene. If so, the developed film or photographic paper with the larger density variation for the same scene produces more image contrast. The contrast of a film or photographic paper are affected by a number of factors including the actual contrast of the subject, the length of exposure, the type of film or paper, the temperature of the developer, the amount of agitation of the developer, the type of developer and the length of development time, among others.

Most printing papers for black and white negatives have a base material coated with a layer of light sensitive emulsion. Variable contrast papers, however, have two such layers or act as if they have two such layers—an emulsion which is sensitive to blue light and another which is sensitive to green light. The blue sensitive layer produces a high-contrast image; the green-sensitive layer gives a low-contrast image. You can get the desired level of contrast by using a filter in the enlarger head or under the lens. In this way you can control whether you use one emulsion layer or the other, or a certain proportion of each. The variable-contrast filters are either magenta or yellow. The yellow filter absorbs blue light, so that the green sensitive emulsion layer is affected—giving an image of relatively low contrast. The magenta filter absorbs green light, so that the blue-sensitive layer is affected—to give higher image contrast. Intermediate contrast is obtained by using filters of greater or lesser strengths. Because the variable-contrast filters are often of different densities and because the variable-contrast paper may have a different degree of sensitivity to equivalent amounts of the blue or green light, as a filter is changed, the photographer may have to increase or decrease the exposure time.

U.S. Pat. No. 2,226,167 describes a projection print scale. This product is a piece of clear film that is placed on the black and white photographic printing paper while the paper is exposed to the negative for 60 seconds. The projection print scale has ten sections (in the form of a circle when ten segments or "pie slices"). Each section is equivalent to a neutral density filter that reduces the exposure to the photographic paper. When the photographic paper is developed, the photographer can look at the section that appears best and read an appropriate exposure.

SUMMARY OF THE INVENTION

The main object of the present invention is to inexpensively assist the photographer in selecting the appropriate contrast grade of printing paper or in selecting the appropriate variable-contrast filter for use with variable-contrast paper for the printing of black and white transparencies or negatives.

There are two major decisions a photographer must make in the darkroom in printing a black and white negative after he has selected the negative and the cropping. Those two decisions are (1) how long to expose the printing paper to the negative and (2) what contrast grade paper or, if using variable-contrast paper, which filter to use. The present invention assists the photographer in making the second decision.

The alternatives to using the present invention which are available to a photographer seeking to determine the contrast of black and white negatives are, (1) look at the film and make an estimate and try one or more contrast grades (trial and error) or (2) use an expensive densitometer (costing many hundreds of dollars). By making one test print with the present invention, the photographer can view sections of the film on one piece of paper but as if it had been printed with a number of different contrast grade papers. The photographer can select the most appropriate section on the test print and then make an enlargement using that contrast grade paper or variable-contrast filter.

DETAILED DESCRIPTION OF THE INVENTION

The device shown in the Figure is a clear, positive, color material substrate approximately five inches by seven inches. Although there are many ways to produce such a device it is preferably made from gelatin or acetate and reproduced by a printing or photographic process.

The device has sections 11–16 shown as pie slices with a small colorless gap therebetween and each of which is a color equivalent to a different variable-contrast filter. Since variable-contrast filters as used in enlargers can have different densities and the blue or green sensitive emulsion of the variable-contrast paper can have different sensitivity to equivalent amounts of light, each filter, for use in the device must be corrected with neutral density filters. Generally segments 11–16 will have densities nearly equivalent to each other. Thus an important characteristic of the device is that segments 11–16 have different contrast-producing colors (yellow or magenta), that will produce a number of sections or images on the variable-contrast paper that differ primarily in the contrast each image shows, the overall density of each image will be approximately equal.

Figure 1:
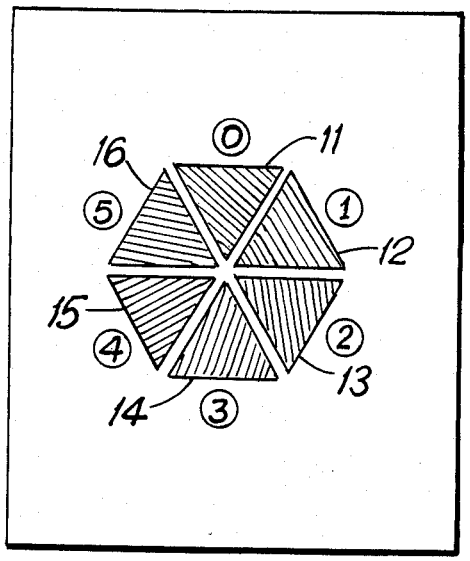
FIG. 1 is a top view of the device according to the invention.

The device can have different versions that contain a different number of variable-contrast filters, for example, one device concentrating on the high contrast grades and another on the low contrast grades. To give the photographer useful information about the contrast grade or filter to use the device would be available in versions that contain between four and six sections each with a different variable-contrast filter and are between four inches by five inches and eight inches by ten inches. In FIG. 1, the six sections have contrast grades 0, 1, 2, 3, 4 and 5.

Figure 2:
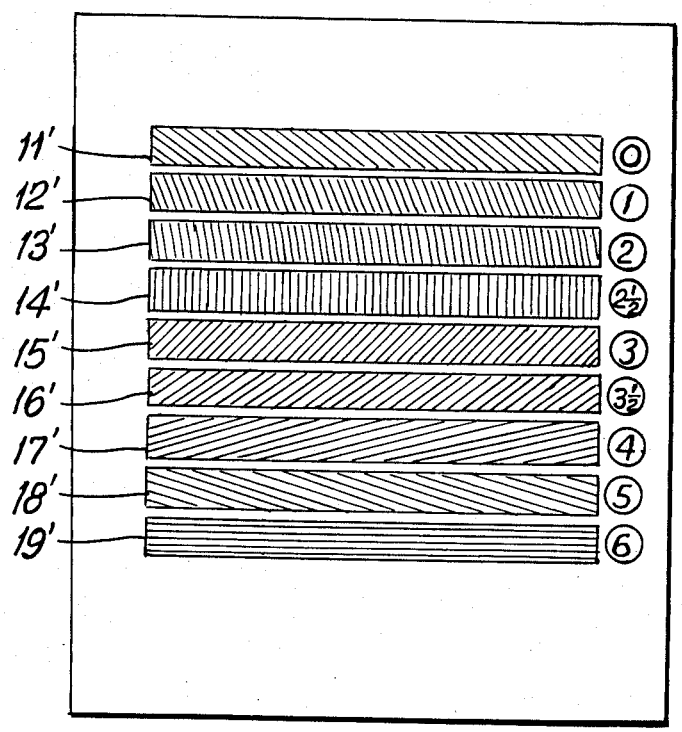
FIG. 2 is a top view of an alternative embodiment according to the invention.

FIG. 2 shows an alternative embodiment of the device wherein the sections are in the shape of horizontal bands 11′–19′.

The method of using the contrast filter selector device is as follows:

The photographer in step one places the transparency or negative film in the enlarger and focuses it. In step two he places the variable-contrast paper on or in the easle and he places the device 10 on the variable contrast paper and holds it flat on the paper with a plate of glass. In the next step he exposes the paper for approximately two and a half times the exposure as determined by a test strip or the Projection Print Scale of U.S. Pat. No. 2,226,167 used with variable-contrast paper without a variable-contrast filter. The length of time of exposure of the device to the variable-contrast paper will vary somewhat depending on the overall density of the variable-contrast filters contained in the device. The exposure time will depend on which manufacturers' variable-contrast filters are used in the device and which manufacturers' variable-contrast paper is used with the device. Since the higher number contrast grade filters such as numbers four through six are generally of a higher density, if they are included as segments of the device, a longer exposure will be needed. The paper is then developed and the user selects the segment that provides the best contrast and the user uses the variable contrast filter that is indicated by the number beside that segment.

It will be appreciated that the instant specification and claims are set forth by way of illustration and not limitation, and that various modifications and changes may be made without departing from the spirit and scope of the present invention.

What is claimed is:

1. A device for selecting a contrast grade of paper or variable-contrast filter for printing a black and white negative, comprising:
    a clear substrate having a plurality of sections, each having a different color equivalent to a different variable-contrast filter grade and each having approximately the same density, adjusted for the speed of the emulsions of the variable-contrast paper.

2. A device according to claim 1, wherein the sections form a circle with each section comprising a segment of a circle.

3. The device according to claim 1, wherein the sections comprise a plurality of parallel bands.

4. The device according to claim 1, wherein each section has indicia indicating the variable-contrast filter or contrast paper grade corresponding thereto.

5. A method for selecting a contrast filter for the printing of a black and white photographic negative, comprising:
    placing variable-contrast paper on an easle;
    placing the negative in an enlarger and focusing the image on the paper;
    placing on the paper a clear substrate having a plurality of sections, each having a different color equivalent to a different variable-contrast filter grade and each having the same overall density when printed;
    exposing the paper for a time greater than that required when not using a contrast filter;
    developing the paper; and
    selecting the sections that provides the best contrast and determining the variable-contrast filter corresponding thereto.

* * * * *

UNITED STATES PATENT AND TRADEMARK OFFICE
CERTIFICATE OF CORRECTION

PATENT NO. : 4,885,607

DATED : December 5, 1989

INVENTOR(S) : Thomas F. Farb

It is certified that error appears in the above-identified patent and that said Letters Patent is hereby corrected as shown below:

IN THE TITLE: "METHOD AND DEVICE FOR SELECTING THE APPROPRIATE CONTRAST GRADE PHOTOGRAPHIC FOR PRINTING A BLACK AND WHITE TRANSPARENCY" should be changed to --METHOD AND DEVICE FOR SELECTING THE APPROPRIATE CONTRAST GRADE PHOTOGRAPHIC PAPER FOR PRINTING A BLACK AND WHITE TRANSPARENCY--.

Signed and Sealed this

Twentieth Day of November, 1990

*Attest:*

HARRY F. MANBECK, JR.

*Attesting Officer*     *Commissioner of Patents and Trademarks*